United States Patent [19]

Winfield et al.

[11] Patent Number: 4,974,157
[45] Date of Patent: Nov. 27, 1990

[54] DATA PROCESSING SYSTEM

[75] Inventors: Alan F. T. Winfield, Hull, England; Rodney M. F. Goodman, Altadena, Calif.

[73] Assignee: Advanced Processor Design Limited, Hull, England

[21] Appl. No.: 396,815

[22] Filed: Aug. 22, 1989

Related U.S. Application Data

[63] Continuation of Ser. No. 275,590, Nov. 23, 1988, abandoned, which is a continuation of Ser. No. 11,854, Feb. 6, 1987, abandoned.

[30] Foreign Application Priority Data

Feb. 6, 1986 [GB] United Kingdom ............... 8602964

[51] Int. Cl.$^5$ .............................................. G06F 7/00
[52] U.S. Cl. .................................. 364/200; 364/244.3
[58] Field of Search ............................. 364/200, 900

[56] References Cited

U.S. PATENT DOCUMENTS

| | | | |
|---|---|---|---|
| 4,173,782 | 11/1979 | Dixon | 364/200 |
| 4,422,141 | 12/1983 | Shoji | 364/200 |
| 4,455,604 | 6/1984 | Ahlstrom et al. | 364/200 |
| 4,694,411 | 9/1987 | Burrows | 364/200 |

Primary Examiner—Michael R. Fleming
Assistant Examiner—Debra A. Chun
Attorney, Agent, or Firm—Burns, Doane, Swecker & Mathis

[57] ABSTRACT

A data processing system for executing operations on electronic data comprises a stack for performing numerical operations functionally situated between the top of the stack and the next storage position in the stack so that operands on which an operation is to be performed are automatically present at inputs of an arithmetic logic unit for performing the operations.

3 Claims, 7 Drawing Sheets

DATA PROCESSING SYSTEM

This application is a continuation of application Ser. No. 275,594, filed Nov. 23, 1988 now abandoned, which is a continuation of application Ser. No. 011,854, filed Feb. 6, 1987, now abandoned.

The present invention relates to a data processing system and more particularly, to a data processing system for executing arithmetical and logical operations on data stored in a stack. The data processing system of the present invention provides an improved computer architecture which enables these arithmetical and logical operations to be carried out at very high speed which is advantageous with high level procedural languages, such as "C" Algol, Pascal and the like.

A stack can be described as a data structure realised in random access memory (RAM), which is divided into a plurality of discrete storage elements, each of which is of fixed word length. In use, one of these elements is selected by a stack pointer (SP) and thereafter assumes a position at the top of the stack (TOS). Data can only be written or read from the selected TOS in accordance with the so called last in first out principle (LIFO). Moreover, arithmetical and logical operations, such as addition, substraction, multiplication and division, are conventionally performed between data in the TOS and data stored in the element next to TOS, that is next on stack (NOS) when executing high level languages (HLL'S)

In conventional data processing systems one or more stacks are physically situated in a main memory which is connected to a separate central processing unit (CPU). The CPU generally comprises a plurality of holding registers connected to an arithmetical logic unit (ALU) and an execution sequencer which provides instructions or micro-orders. In carrying out an arithmetical or logical operation data has to be transferred between the stack and the CPU before the operation can be carried out in the ALU. This data transfer requirement places a substantial overhead on the speed of execution of the operation because of the very large number of data transfers which have to occur during the operation. In this respect, it must be realised that each data transfer requires a separate instruction to be given by the execution sequencer before it can occur.

For example, the arithmetic expression x+y in a computer program would be evaluated by firstly pushing (transferring) x onto the top of the stack, then pushing y onto the top of the stack so that x is moved to the next position on the stack. y is then popped off the top of the stack to a holding register in the CPU, whereupon x is moved back to the top of the stack. x is then popped off the top of the stack to a further holding register. The ALU then carries out the arithmetical operation x+y and the result is then transferred back to the top of the stack from where it can be read. Although much of the movement of data in the stack between the TOS and the NOS is controlled by software, as opposed to physically moving the data from one stack element to another, it will be apparent that the procedure described requires five independent transfers of data between the stack and the separate CPU, together with five independent instructions from the execution sequencer to bring the data transfers about.

A data processing system of the type described above is discussed in the introduction to European Patent No. 011442 and it is suggested that arithmetic and logical operations can be performed in as few as three steps e.g. PUSH A, PUSH B and ADD. However, this is very much an over simplification of the data transfers which occur and thus it is mis-leading. As has been indicated hereinabove the data must actually be popped off the top of the stack and transferred to the separate CPU before the operation can be carried out and the result must be transferred back to the top of the stack to be readable.

It is an object of the present invention to provide a data processing system which reduces the number of data transfers required to perform arithmetical and logical operations, to and from a stack.

It is a further object of the present invention to eliminate such data transfers that may be required to execute operations, in a high level language, by the incorporation of one or more stacks within the physical implementation of a central processing unit.

According to a first aspect of the present invention there is provided a data processing system for executing arithmetical and logical operations on electronic data comprising a stack and means for performing arithmetical and logical operations, characterised in that said means for performing arithmetical and logical operations is connected to the top of said stack and to the next position on said stack so that operands on which an operation is to be performed are automatically present at input points of the said means for performing said arithmetical and logical operations.

Advantageously, an output point of said means for performing arithmetical and logical operations is connected to the top of the stack so that the result of an operation is automatically returned thereto. This allows the result to be immediately readable.

It is preferable that the means for performing arithmetical and logical operations comprises an arithmetical logic unit.

The stack may be a data structure implemented in random access memory which is addressed by means of a stack pointer.

The data processing system may define an arithetic stack unit and form part of a central processing unit.

Said means for executing operations on data may be situated on a circuit board or boards or implemented in an integrated circuit or circuitry or a combination of either.

According to the second aspect of the present invention there is provided a central processor unit (CPU) comprising at least one data processing system in accordance with the first aspect of the present invention.

Preferably, the central processing unit further comprises an execution sequencer which is connected to the stack and to the means for performing arithmetical and logical operations. Preferably, said execution sequencer is functionally connected to a further stack means (a return stack unit) for the purpose of storing return addresses of high level language procedures.

In a preferred embodiment of the second aspect of the present invention the central processor unit comprises an arithmetic stack unit, a return stack unit and an execution sequencer in combination.

For clarity the execution sequencer is taken to comprise means for providing micro-code control and coordination of the CPU.

Embodiments of the present invention will now be described, by way of example, with reference to the accompanying drawings, in which.

The benefits of programming in High-Level languages (HLLs) are manifold and well known, yet despite the widespread availability of HLLs for conventional processors, many applications engineers are still forced to undertake substantial developments entirely in assembly language. This is the case particularly in demanding real-time applications where execution speed is of the utmost importance and even the most efficient compiled HLL cannot compete with carefully handcoded assembler. (Furthermore real-time applications often require extensive inputoutput handling, and interrupt servicing, aspects poorly catered for in most HLLs)

It has been widely accepted as a 'fact of life' that programming in a HLL will incur a performance penalty, against the same program coded in assembler, but why should this be so?

An analysis of the code generated by compilers for 'procedural' high-level languages, such as Pascal and C, quickly reveals a heavy reliance at runtime upon one or more stack (last-in first-out) data structures. Stacks are needed for:

storage of 'local' variables, so that during recursion a new set of locals may be created, temporary storage during the execution of complex arithmetic expressions, and storage of subroutine 'return' addresses to facilitate procedure or function call and return It is easy to show that procedural HLLs which support local variables and recursion (of which Pascal and C are typical) cannot be executed at all without at least one stack data structure, and it is therefore no surprise to learn that compiler writers often write compilers for 'virtual' stack machines as embodied by Pascal P-code, for example.

Consider now that conventional 'register' based processors (e.g. 8086 or 68000) contain no 'hardware' stacks, but instead must implement these essential data structures as reserved areas of the main memory——which are simply accessed in a last-in first-out fashion——and it soon becomes apparent that this is the principle cause of the poor performances of HLLs on these processors. Of course most processors, including the two mentioned above, do make the gesture of reserving one or more registers in the CPU as stack pointers, but these are simply memory address registers supported by special machine instructions such as PUSH (decrement stack pointer and store data into memory pointed to by the stack pointer) and its complement POP (fetch data pointed to by stack pointer and then increment stack pointer). The provision of stack pointers does not overcome the fundamental execution time overhead imposed by the large number of data transfers between the stack data structures in main memory and the CPU.

Figure 1:
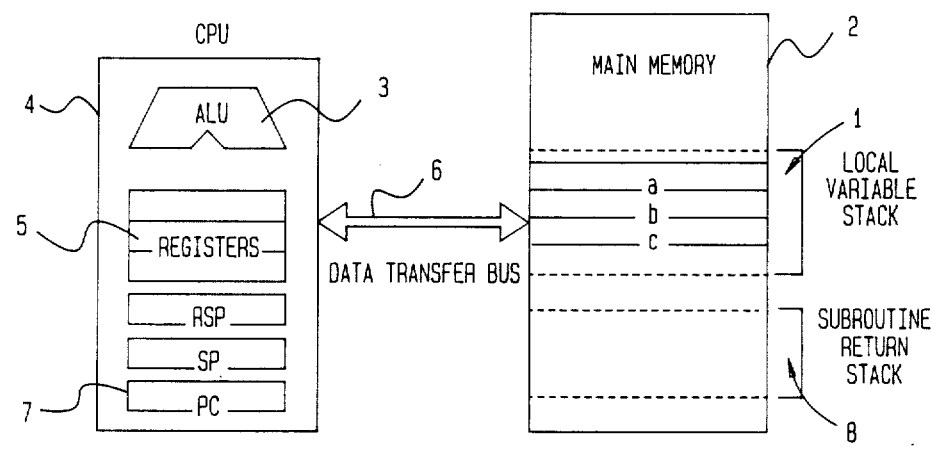
FIG. 1 shows a schematic block diagram of a conventional stack structure.

Referring now to FIG. 1 of the accompanying drawings the points made hereinabove will be illustrated with reference to the fragment of C code.

int a,b,c;

a=b+c;

The three variables a, b and c are locals and therefore must be stored within a stack data structure 1 in main memory 2. The arithmetic addition of b and c can only be carried out by the hardware Arithmetic Logic Unit (ALU) 3, within the Central Processor Unit (CPU) 4, and so b and c must be moved to the ALU 3 via one or more CPU registers 5. After the addition the result, a, must be moved back from the CPU 4 to the stack 1; a sequence of operations achieved by the following 68000 assembler, MOVE b(SP),DO
ADD c(SP),DO
MOVE DO,a(SP)

This sequence assumes that the locals a, b and c are offset from the top of the stack by a, b and c, and typically requires thirty-six clock cycles and nine data bus transfers. Clearly at least one third of this effort is wasted transfering data between the stack 1 and ALU 3. It should also be noted that data transfers via the data transfer bus 6 between the CPU 4 and the main memory 2 are much slower than data transfers within the CPU itself.

Again referring to FIG. 1 consider the actions required to perform a subroutine call and return. Before loading the program counter (PC) 7 in the CPU 4 with the address of the start of the called subroutine the current value of PC must first be pushed onto a return address stack 8 in the main memory 2. At the end of the subroutine the return address must be popped, from the return address stack 8 in main memory 2, into the PC 7 in the CPU 4. The physical separation of the program counter 7 and the return address stack 8 (like the ALU - local variable stack) imposes the penalty of two main memory transfers. The 68000 requires, for the BSR, RTS pair of instructions, thirty-four clock cycles and five data bus transfers.

Analysis shows that HLL execution speed is particularly sensitive to the time required for subroutine call and return; a program of average complexity on a conventional processor will often spend 25% of runtime simply executing call and return. This proportion of time becomes worse for systems of greater complexity because of the increased number of layers of subroutine nesting.

Figure 2:
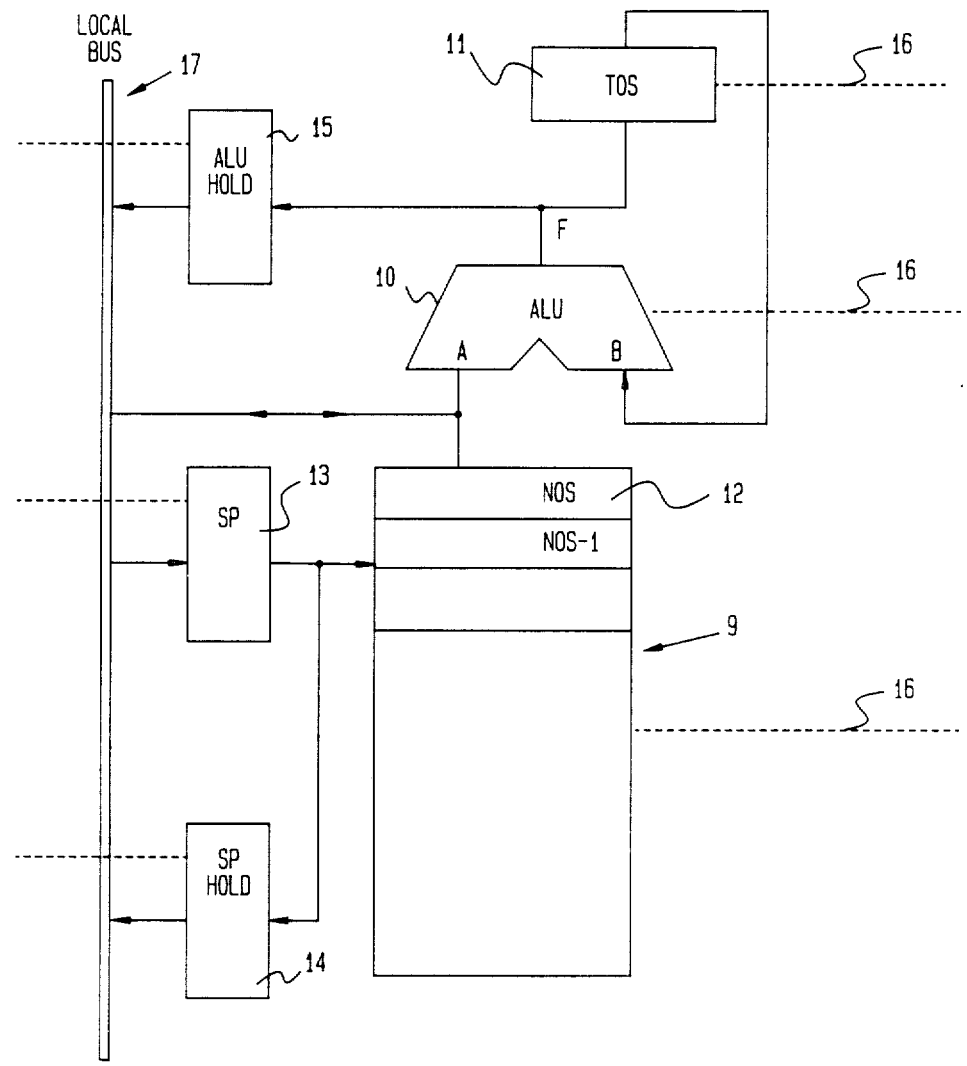
FIG. 2 shows a schematic block diagram of a data processing system in accordance with the first aspect of the present invention.

Referring now to FIG. 2 of the accompanying drawings, there is shown a data processing system which forms part of a central processing unit and comprises a stack 9 in the form of a random access memory. The system further comprises an arithmetic logic unit (ALU) 10 functionally situated between top of stack 11 and next on stack 12 and a stack pointer 13. The stack pointer 13 permits individual locations on the stack 9 to be addressed. For example, if it is necessary to operate on a number held in the fourth position on the stack 9 the stack pointer 13 would be set to the physical address of the fourth position. The drawing also shows a stack pointer hold 14 for temporarily storing the value of the stack pointer 13 and an arithmetic logic unit hold 15 for temporarily storing the output value F of the arithmetic logic unit 2. The stack 9, stack pointer 13, stack pointer hold 14, arithmetic logic unit 10 and arithmetic logic unit hold 15 are herein together referred to as an arithmetic stack unit. The dotted lines 16 in the drawing represent control lines for transferring micro-orders to and from an execution sequencer (not shown) to the functional elements of the arithmetic stack unit. A local bus 17 acts as a data highway for transferring numerical values to and from the arithmetic stack unit. The stack 9 operates on the first in last out principle such that data pushed (transferred) onto the stack 9 would always occupy the top of the stack position 11 and further pushing of data will push the preceding data further down the stack 9. Removal of data from the stack 9 is the reversal of this process.

In order to perform, for example, the arithmetic operation $x+y$ to give the result z in a high level language, first x and then y are pushed onto the stack 9 such that x appears at the next on stack position 12 and also at input A of the arithmetic logic unit 10, and y appears at the top of stack position 11 and at input B of the arithmetic logic unit 10. The summation of x and y is carried out be the arithmetic logic unit 10 under the control of the execution sequencer (not shown) and the result z output from the arithmetic logic unit 10 which is also connected to the top of stack position 11 appears at F. Thus, the result is now automatically at the top of the stack position 11.

In the arithmetic operation $(x+Y)-w$ to give the result q the $x+y$ operation is first carried out (as above) and the result z appears at the top of stack position 11. Then w is pushed onto the stack 9 so that z is now in the next on stack position 12 and both z and w are at the input positions A and B of the arithmetic logic unit 10. The subtraction is performed by the arithmetic logic unit 10 and the result q appears at the top of stack position 11.

The data processing system of the present invention enables operations that would hitherto have to be carried out in a central processing unit that was separate from the stack to now be performed within the stack by the user of an arithmetic logic unit connected between the top of stack and next on stack positions.

Data is not now required to be transferred between the stack and the separate central processing unit because the stack itself is now effectively situated within the central processing unit. The removal of this data transfer overhead enables high level language instructions to be executed directly at speeds substantially in excess of those in the case of conventional or known computer architecture.

Figure 3:
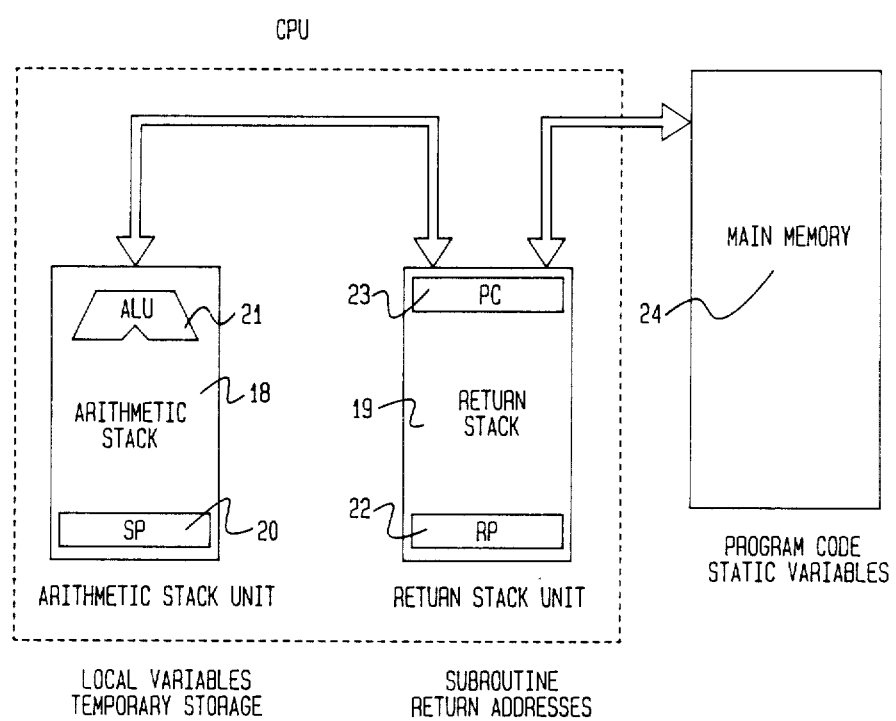
FIG. 3 shows a schematic block diagram of a central processor unit comprising a data processing system in accordance with the second aspect of the present invention.

Referring now to FIG. 3 of the accompanying drawings there is shown a two stack architecture with main memory. One of the stack units is a data processing system in accordance with the present invention and defines an arithmetical stack unit as described above.

Examination of the relative merits of one-stack versus two-stack architecture clearly favours a twostack approach, with one stack coupled to an ALU and reserved for local variable storage (the arithmetic stack), and the other stack coupled to the PC and reserved for return addresses (the return stack). The advantage of a two-stack approach may be simply illustrated by the need to pass parameters, via the stack, to a subroutine. In a one-stack machine parameters placed on Top Of the Stack (TOS) will no longer be on TOS after the subroutine call, but will be buried underneath the subroutine's return address on the same stack. In a two-stack machine local variables and subroutine operands will retain the same relative position on the arithmetic stack despite any number of nested subroutine calls, and therefore the code to access locals can be simpler and more efficient.

In FIG. 3 there are shown an arithmetic stack unit (ASU) 18 and a return stack unit (RSU) 19. The arithmetic stack unit 18 essentially consists of a hardware stack with its own stack pointer (SP) 20 and an arithmetic logic unit 21. The ALU is deliberately shown inside the arithmetic stack unit 18 since it is intended to be blended within the stack in a manner which will minimise data movement between the stack and ALU 21. As previously described with reference to FIG. 1 the top of stack (TOS) operands will always be automatically available at the inputs to the ALU 21. Thus the arithmetic stack unit 18 is neither just a stack nor just an ALU. Likewise the return stack unit (RSU) 19 consists of a hardware stack, with its stack pointer (RP) 22 and a program counter (PC) 23 which points to program code in main memory.

Although the ASU 18 and RSU 19 are both part of the CPU, when coupled with main memory 24 as shown, the complete machine has three independent memory structures each fulfilling a specific functional requirement of HLLs; the ASU 18 for local variables and temporary storage, the RSU 19 for subroutine addresses and main memory for program code and global (static) variables. Not only does this structure substantially reduce the number of data transfers during HLL execution, particularly on the relatively slow main memory data transfer bus, but an additional benefit is that the three memory structure may operate in parallel so that, for example, arithmetic on local variables may be carried out at the same time as a subroutine call.

Figure 4:
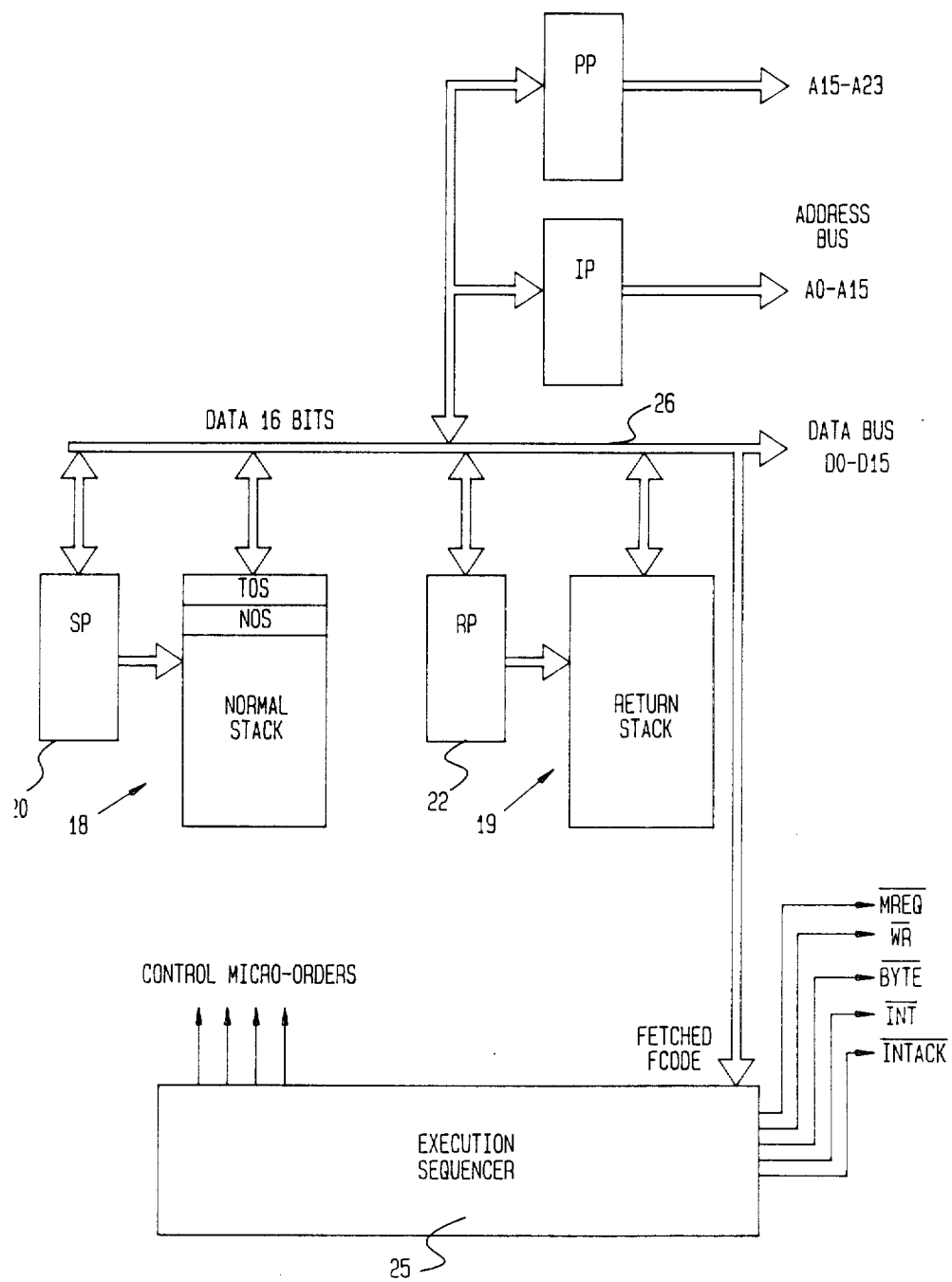
FIG. 4 shows a more detailed schematic block diagram of a central processor unit comprising a data processing system in accordance with the second aspect of the present invention.

A practical realisation of the two-stack architecture described with reference to FIG. 3 is shown in FIG. 4 and is in the form of a 16-bit discrete CPU designated MF 1600CPU. For ease of reference the same reference numerals have been used to identify components common to FIGS. 3 and 4. This single board CPU utilises 70 standard SSI and MSI Advanced Schottky TTL devices on a standard double eurocard, and with a clock speed of 20 MHz gives a maximum execution speed of 6.66 million HLL instructions per second.

The two stacks 18, 19 are realised with 35 nS SRAM, and are both 16-bits wide and 1024 words deep. The architectural block schematic shown in FIG. 4 shows an execution sequencer 25, which contains 512 56-bit words of microcode. A bus structure 26 provides 24-bit address, 16-bit bidirectional data, and control signals for high-speed synchronous operation at 6.6 million bus read or write cycles per second.

The instruction set is micro-programmed and extensible, and includes specific primitives for the execution of HLL, such as C, Pascal, Algol and the like. The microprogrammable instruction set allows the processor to be tailored not only to particular highlevel languages, but to applications by allowing the incorporation of applications specific primitives.

To illustrate the power of this instruction set consider the following comparisons with 68000 assembler:

(1) The high-level language DO loop. MF 1600CPU implements a runtime loop primitive which maintains index and loop end values on the return stack, and performs a signed increment of the loop index, a comparison with the end value, and a conditional branch in 8 clock cycles, or 400 nS, allowing one million HLL DO loops in 400 mS. The much less powerful 68000 decrement and branch if not equal to zero instructions requires 10 clock cycles.

(2) The majority of MF 1600 CPU arithmetic and logical operations take their operands from top of stack and next on stack, and leave the result on top of the stack, and execute in 3 clock cycles. The equivalent operations on the 68000, for example, top of stack add,

MOVE (SP)+,D0
ADD (SP),D0
MOVE D0,(SP)

require 24 clock cycles. Even the much less powerful register arithmetic and logical operations require 4 clock cycles.

(3) A multi-tasking context switch on the MF 1600CPU simply requires the two stack pointers, SP and RP, to be saved and then re-loaded to point to the stack partition for the newly active task. There are no other registers to be saved or restored and so a full context switch can be executed in 5 microseconds, compared with the equivalent operation in 68000 PDOS requiring 140 microseconds.

This following description provides detailed documentation for the MF1600CPU (ver.1.2) processor. The scope of this description is to describe the hardware theory of operation of MF1600CPU with reference to functional block diagrams.

Functional Organisation of MF 1600CPU

Figure 5:
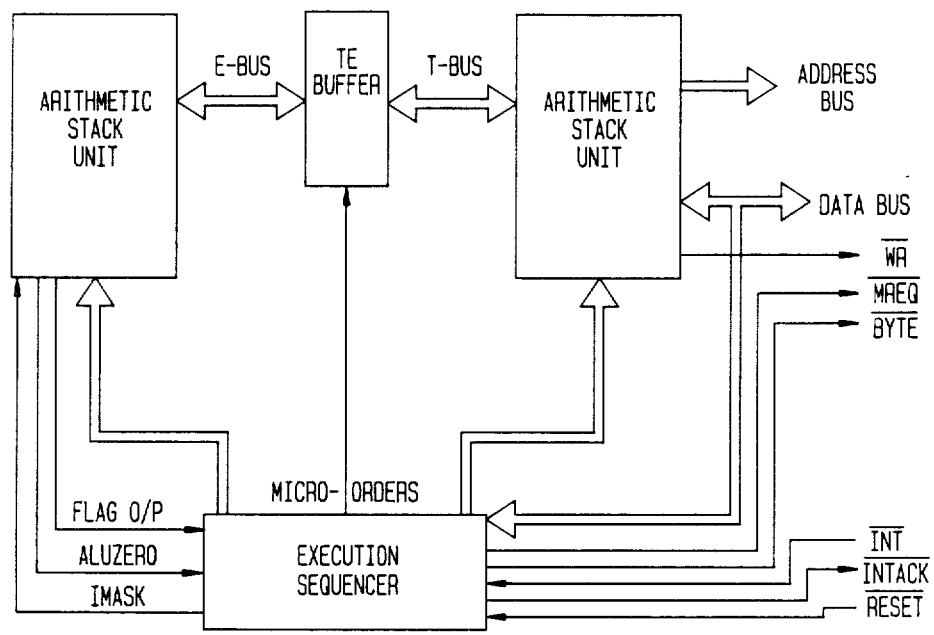
FIG. 5 shows a schematic block diagram of a central processor unit comprising a data processing system in accordance with the second aspect of the present invention with the buses identified.

Refer to FIG. 5. MF1600CPU splits into three distinct functional blocks, (1) the Arithmetic Stack Unit (ASU) used for all arithmetic and logical operations and stack storage of temporary and local variables, (2) the Return Stack Unit (RSU) for storage of subroutine return addresses and to provide address and data communication with external (program and static variables) memory, and (3) the Execution Sequencer to provide micro-code control and coordination of the whole processor.

FIG. 5 shows how these three units are organised and linked together by a number of bus highways.

All data into and out of the ASU is via the E (historically from Execution-) bus. This is a 16-bit bi-directional tristate bus. The equivalent principal internal bus of the RSU is referred to as the T (historically Threader-) bus, which is also a 16-bit bi-directional tristate bus. The T- and E- buses and hence the ASU and RSU are linked through the bi-directional TE buffers. Under micro-code control the TE buffer allows data to be transferred from T-bus to E-bus, or from E-bus to T-bus, or will allow the two buses to be isolated and thus enable the ASU and RSU to operate concurrently (albeit synchronously). All data within the ASU is inverted (active-low)—since the ALU within the ASU operates best on active-low data—and the TE buffers are therefore inverting, so that data within the RSU and external memory is all active-high.

The RSU generates the 24-bit non-tristate address bus and the 16-bit bi-directional tristate data bus for external memory and i/o. Control signals for handshaking with external memory are generated by the execution sequencer, and provide a high-speed synchronous interface with external memory for program and data transfers.

The Execution Sequencer takes input directly from the external data bus and interprets this input as one of a number of instructions (or High Level Language (HLL) primitives). Each instruction causes a corresponding, arbitrary length, sequence of 'micro-orders' to flow out to the ASU, RSU, and TE buffer thus controlling and coordinating the activity of the CPU as a whole and effecting the specified instruction. Each micro-order is a single named control line to a device within the ASU, RSU or TE and will in general either (1) enable a tristate device to drive a bus, (2) latch data into a device, (3) clock a synchronous device e.g. counter or shift register, or (4) select the function of a device. An understanding of the function of each micro-order is essential to a detailed understanding of MF 1600CPU and is pre-requisite for micro-code programming.

Micro-order Naming Conventions

The name of each micro-order is chosen to be as descriptive as possible of the function of the micro-order and accordingly the following conventions are adopted.

1. Any micro-order which causes data to flow from a bus to a device, or a device to a bus has an arrow indicating the direction of data flow. Thus X→Y means either
   1. if Y is a 'device' then latch data from X (bus or device) into device Y, or
   2. if X is a 'device' and Y is a 'bus' then enable the contents of X to drive bus Y, or
   3. if both X and Y are buses then enable whatever is on bus X to drive bus Y.

If the arrow is bi-directional, i.e. X←→Y, then this micro-order will enable data to flow from X to Y or from Y to X (with the actual direction specified by another micro-order), where X and Y may be devices or buses as detailed above.

2. Micro-orders which select the function of a multi-function device X are referred to as Xfunc or Xfunc=.

3. Micro-orders which enable a counter device X to increment or decrement as referred to as Xclock.

4. Micro-orders which are gated with the processor clock in order to syncronise with clock signal DCLK are prefixed with the letter D. The minimum active duration of these micro-orders is thus shorter than the 1 t-state minimum of non D-prefixed micro-orders. See section 4 below.

The 'Default' state for Micro-orders

In a micro-coded CPU such as MF1600CPU it is important that every instruction, i.e. sequence of micro-orders, leaves the CPU in the same known state. This 'default' state is specified by the default micro-order states, i.e. on, off or function selected for every micro-order in the CPU.

The Arithmetic Stack Unit (ASU)

Figure 6:
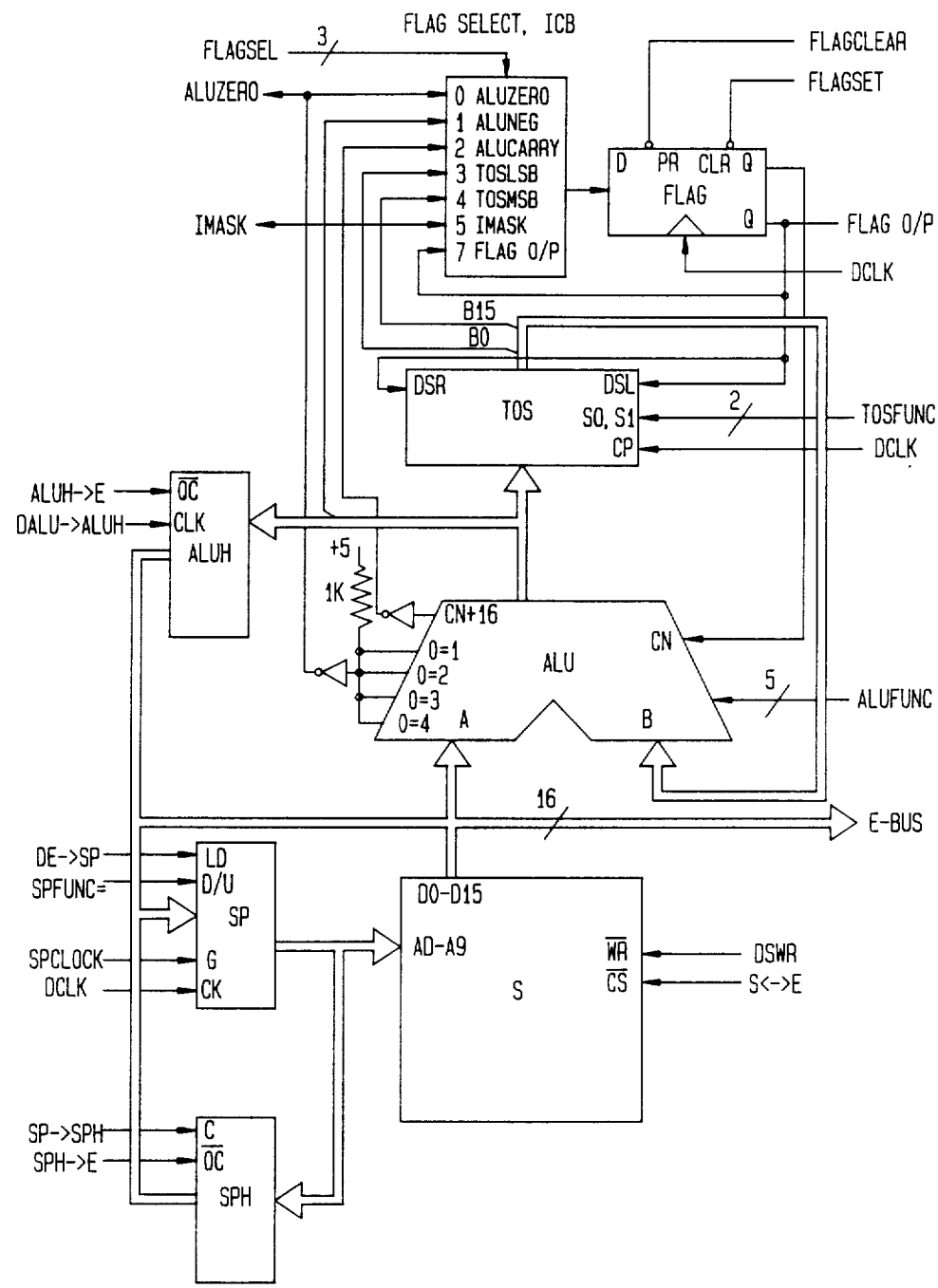
FIG. 6 shows a detailed block and circuit diagram of a data processing system in accordance with the first aspect of the present invention defining an arithmetic stack unit for use in a central processor unit according to the second aspect of the present invnetion.

Refer to FIG. 6.

The functional elements of the ASU are defined as follows.

(a) Top Of Stack (TOS) Register

The TOS register is a 16-bit parallel-in parallel-out shift register, implemented by four 74F 194 4-bit registers, IC10-IC13.

The principle function of TOS is to hold the current top-of-stack value, and its close coupling with the ALU; with ALU outputs feeding TOS parallel inputs and TOS parallel outputs feeding ALU 'B' inputs is designated to efficiently facilitate arithmetic between the TOS value and whatever is present on the ALU 'A' inputs (normally the next on stack value) and allow the result of the arithmetic operation to be optionally latched into TOS, overwriting the old contents. TOS is a shift register so that the shift operations; arithmetic and logical shifts left and right, and rotates, may be carried out directly on the TOS value.

The most and least significant output bits of TOS, TOSmsb and TOSlsb, are connected to the flag selector, and shift-in and -out bits connected to the flag output, to allow shifts and rotates through the flag, for multiple precision shifts etc.

TOS micro-orders are, TOSfunc (2 lines) to select the current function of the TOS register, as follows,

| TOSfunc= | S1 | S0 |
|---|---|---|
| hold | 0 | 0 |
| right | 0 | 1 |
| left | 1 | 0 |
| load | 1 | 1 |

Note that: the clock input of TOS is driven by the DCLK signal. DCLK is not a micro-order but a continuous clock signal, used for all synchronous devices, and supplied by the execution sequencer. Thus since TOS is being clocked then TOSfunc must be set to 'hold' for the TOS value to remain unchanged. TOSfunc=hold is thus the recommended default state of TOSfunc.

(b) Arithmetic Logic Unit (ALU)

The ALU is realised with four 74AS881 4-bit devices, IC14-IC17, connected in a ripple through carry configuration. (The additional speed afforded by the use of a carry look ahead generator is not required for the design speed of 1 t-state=50 nS.)

The ALU inputs are driven from the E-bus and may therefore be fed by any of the devices which drive the E-bus, namely: the arithmetic stack (S), the ALU hold buffer (ALUH), the stack pointer hold buffer (SPH), or T-bus to E-bus buffers (TE). Thus arithmetic and logical operations may be performed under microcode control, with minimal preparation, between TOS and any value in S, the current SP value via SPH, the value stored in ALUH (which may have been an earlier result temporarily held in ALUH), or any value on the T-bus via TE (i.e. values in the return stack R). However the majority of standard ALU functions of MF1600CPU are performed between NOS and TOS and thus the default A inputs to ALU are from S, with SP pointing to NOS.

ALU has carry input and output bits, together with an ALU=0 bit, all of which connect to the flag structure to allow multiple precision arithmetic, comparison operations etc. Note that: because all data operated on by the ALU is inverted (active low data), but the flag operates on 'true' logic (unlike the rest of the ASU), the zero and carry-out bits of the ALU need to be inverted by IC24-A and IC24-B before going into the flag selector, and the ALU carry-in bit is also supplied by NOT flag.

ALU micro-orders are,

ALUfunc (5 lines).

The recommended default ALU function, selected at the end of each instruction, is ALUfunc=TOS so that TOS is available at the inputs of ALUH and therefore may be rapidly placed onto the E-bus, if needed, at the start of the next instruction.

(c) The Arithmetic Stack (S)

The arithmetic stack is realised by four 1024 by 4 bit AMD2149-35 35 nS maximum access time SRAM devices IC18-IC21. Clearly S has no intrinsic stack (LIFO) action, but with an up/down counter (SP) driving it's address lines and appropriate micro-code control, the combination of S and SP implement a fast hardware stack. Data of the E-bus may be pushed onto S by (1) incrementing SP and (2) writing E into S, or popped by (1) reading from S and (2) decrementing SP. Thus SP normally points to the NOS value making NOS rapidly accessible.

S micro-orders are,

DSwr, stack write, determines the action of stack read or write, and S←→E, 'S to and from E', to select S for reading or writing.

The recommended default states are (1) DSwr off, i.e. reading from S and (2) S←→E on. Thus NOS will be available on the E-bus, and therefore also the A inputs of ALU at the start of each instruction allowing arithmetic and logical operations between TOS and NOS to be performed with minimum preparation, particularly avoiding the need to wait for S access time. Note that if S←→E on is adopted as a default then ALUH→E and SPH→E must default off, and TE must not be drinving E.

(d) The Stack Pointer (SP)

A 12-bit stack pointer is implemented with three 74F191 synchronous 4-bit up/down counters, IC3-IC5, although only ten lines are actually utilised to drive S address lines A0-A9. SP is preset loadable to allow the stack pointer value to be initialised (e.g. by SP!), and also to allow S to be randomly accessed under microcode control (e.g. by PICK).

SP micro-orders are,

DE→SP, 'E to SP', to preset load SP from the value on the E-bus,

SPfunc=, to select the counting function of SP as 'up' or 'down', and

SPclock, to clock the counter.

(e) Stack Pointer Hold (SPH)

A transparent latch is realised with two 74AS573 devices, IC6 and IC7, in order to provide (1) a means of gating the current SP value onto the E-bus, for instructions such as @ and PICK, and (2) a means of holding the current SP value while SP is overwritten with a temporary value, to allow random access of S (e.g. for PICK). After the random stack access SP may then be quickly restored to its current (e.g. NOS) value by enabling SPH to drive the E-bus (with SPH→E), then loading SP with the E-bus value (with DE→SP).

SPH micro-orders are,

SPH→E, 'stack pointer hold to E', to enable the contents of SPH- or SP- onto the E-bus, and SP→SPH, 'stack pointer to stack pointer hold', to latch SP into SPH.

(f) Arithmetic Logic Unit Hold (ALUH)

ALUH, realised with two 74AS574 devices, IC1 and IC2, provides a means of (1) gating the function outputs of the ALU onto the E-bus, and (2) if needed temporarily holding the ALU result.

ALUH micro-orders are,

ALUH→E, 'ALU hold to E', to enable the contents to ALUH to drive the E-bus, and DALU→ALUH, 'ALU to ALU hold', to latch the function outputs of the ALU into ALUH.

It is recommended that the default state of the ALUH micro-orders, is (1) ALUH→E off i.e. ALUH not driving the E-bus, and (2) DALU→ALUH on so that the function outputs of the ALU are continuously latched into ALUH. Thus if the default ALUfunc=TOS, as recommended above, then TOS may be made available to the E-bus within the first t-state of an instruction by simply asserting ALUH→E (and of course setting S←→E off).

(g) Flag Select and Flag

A single flag is provided by D-type latch IC9-A. The flag output FLAG O/P is available to (1) the execution sequencer to facilitate micro-code conditional branching, and (2) TOS shift-right and shift-left inputs and ALU carry input. The flag may be set or cleared under micro-code control using FLAGset and FLAGclear, or loaded via the flag select multiplexor IC8 (74AS151) with any of seven values, ALUzero, indicating that ALU function outputs are all zero, ALUneg, or ALU function output bit 15, indicating ALU function output is negative, ALUcarry, the carry output bit of the ALU, TOSlsb, bit 0 of the current TOS value, TOSmsb, bit 15 of the current TOS value, IMASK, the current state of the interrupt enable mask within the execution sequencer, or FLAG O/P, fed back from the flag true output.

The flag thus has a multiple role in that it may be used to implement conditional or comparison instructions, i.e. 0<,0=or ?BRANCH by providing one of a number of flag states to the execution sequencer. In a general sense the micro-code programmer has the ability to 'branch on' ALU zero, ALU negative, ALU carry, TOS lsb etc.

Alternatively the flag and flag selector, under micro-code control, provide the means for arithmetic and logical shifts or rotates with 'zero', 'one', 'carry' or any other flag state shifted in. Multiple precision arithmetic or logical operations may thus be easily accommodated.

Note that: the flag is not intended to be accessible by the 'assembler' or high-level language programmer, and HLL primitives do not require conventional assembler flag manipulation instruction. The flag is intended only to be accessible to the MF1600CPU micro-code programmer.

Flag and flag selector micro-orders are,

FLAGsel, 3 lines, to select one of the seven flag inputs listed above to be presented to the D input of the flag D-type, FLAGclear, to force FLAG O/P to zero, and FLAGset, to force FLAG O/P to one, i.e. set.

Note that: the clock input of the Flag D-type is provided by DCLK, this is not a micro-order but a continuous t-state clock. Thus to hold a flag value unchanged over a number of t-states the FLAGclear and FLAGset orders must be both off, and FLAGsel must select the FLAG O/P, to continuously re-circulate the flag value.

Return Stack Unit (RSU)

Figure 7:
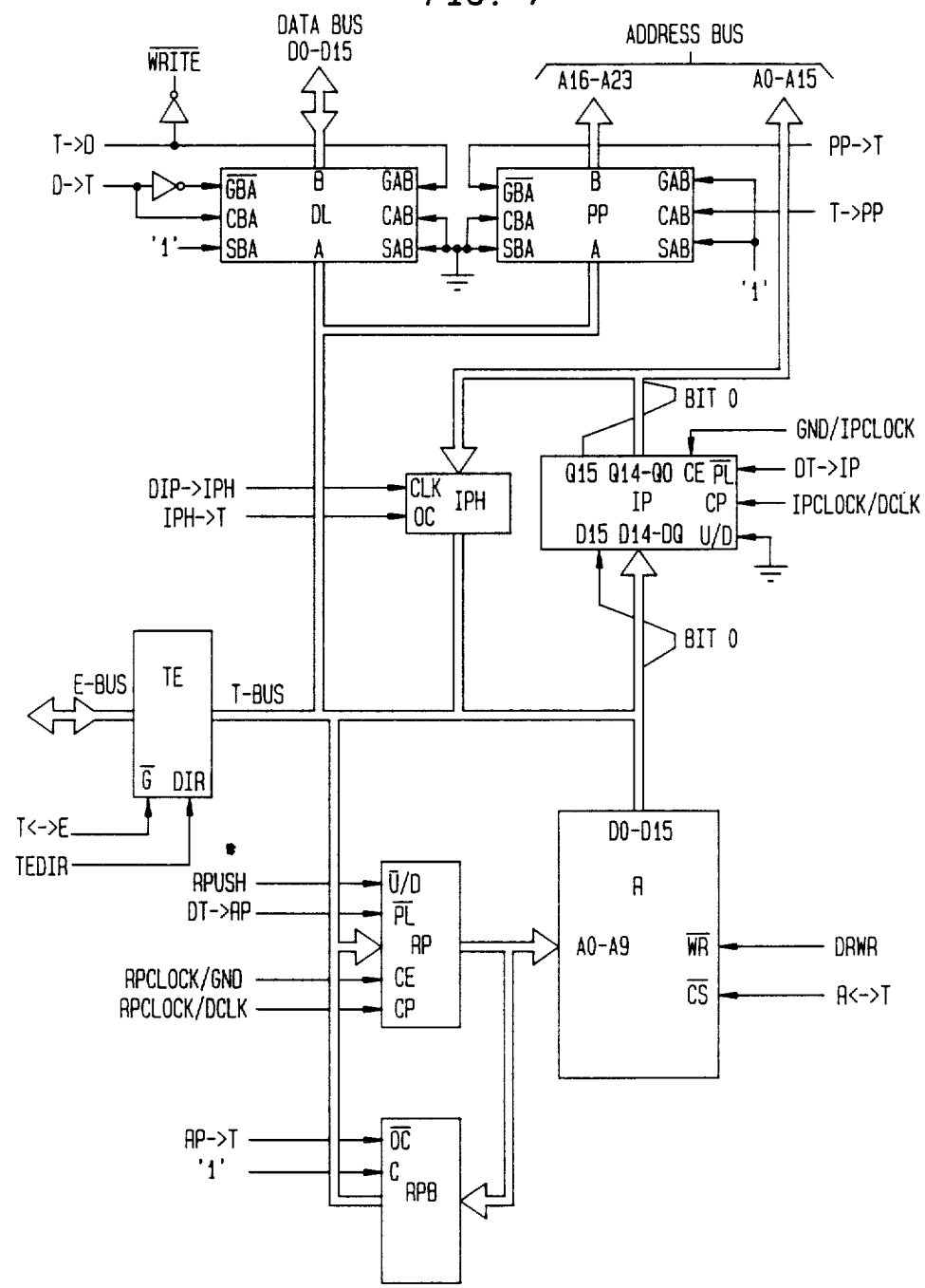
FIG. 7 shows a detailed block and circuit diagram of a return stack unit for use in a central processor unit in accordance with the second aspect of the present invention.

Refer now to FIG. 7. MF1600CPU1.2T for the full circuit diagram.

The functional block element of the RSU are defined as follows:

(a) TE Buffers (TE)

The TE buffers, realised with two 74AS640 devices IC22 and IC23, provide the interface between the E-bus within the ASU and the T-bus within the RSU. TE thus interfaces between the ASU and the RSU and has three modes of operation, (1) E-bus and T-bus isolated, T←→E off, (2) E-bus data driving the T-bus i.e. E→T and (3) T-bus data driving the E-bus i.e. T→E.

Note that the TE buffers are inverting, since all data within the ASU (with the exception of the Flag) is active-low, but data within the RSU is active-high. Clearly all data into the ASU or out of the ASU must go through TE, and TE performs the active-high to active-low inversion.

TE micro-orders are,

T←→E, 'T to and from E', enables TE buffers. When off neither T-bus nor E-bus is driven, and TEdir, 'TE direction', determines the data flow direction as T→E or E→T.

(b) Input Pointer (IP)

The input Pointer is the functional equivalent of a program counter, and is realised with four 4-bit 74F191 synchronous counters IC32-IC35. IP is preset loadable from the T-bus and may thus be quickly loaded with a subroutine return address from the return stack R or a memory address reference from the ASU via the TE buffers. IPH is provided to allow temporary storage of the current IP value during such random memory accesses, or to make IP available to the T-bus e.g. for subroutine call (thread).

MF1600CPU is a 16-bit byte addressed processor, and all instructions are 16-bit values on word, or even-byte, boundaries in main memory, thus IP is normally required to increment by two to point to the next instruction to be fetched and executed. In order to allow the fastest possible increment by two the output bits of IP Q0-Q14 actually drive address lines A1-A15 respectively; a single increment of IP will then advance the address by two bytes. To allow preset loading of byte addresses bit 0 of the T-bus is routed through bit 15 of IP. Note that this scheme only fails for the single case in which IP contains the true address FFFE hex, and an increment would then cause a carry into Q15 resulting in IP=1, rather than 0; this case should never occur in practise because address FFFE is the final word address of a 64 k page of memory and clearly should never contain in-line primitives.

IP micro-orders are,

DT→IP, 'T-bus to IP', preset loads IP from the T-bus, and IP clock, increments IP by two as explained above.

Note that: the clock input of IP is optionally driven by the continuous clock signal DCLK, but an increment of IP will only occur when the chip enable is asserted using IPclock. The reason for doing this is that asserting IPclock on for n consecutive t-states will give n increments of IP, whereas if the clock input of IP were directly driven by microcode line IPclock n increments would require 2 n t-states.

Note also that the U/D line of IP is tied low since IP is never required to decrement.

(c) Input Pointer Hold (IPH)

The Input Pointer Hold latch, realised with two 74AS574 devices IC25 and IC26, provides a means for (1) allowing the current IP value to be stored temporarily while IP is preset loaded with a random memory address during e.g. @ or ! instructions, and (2) allows the value of IP to be placed onto the T-bus for use in, for example, subroutine thread.

IPH micro-orders are,

DIP→IPH, 'IP to IPH', to latch IP int IPH, and

IPH→T, 'IPH to T-bus', to enable the contents of IPH to drive the T-bus, (d) Return Stack (R)

The return stack is realised by four 1024 by 4 bit AMD2149-35 35 ns maximum access time SRAM devices IC36–IC38. Clearly R has no intrinsic stack (LIFO) action, but with an up/down counter (RP) driving it's address lines and appropriate microcode control, the combination of R and RP implement a fast hardware stack. Data on the T-bus may be pushed onto R by (1) incrementing RP and (2) writing T into R, or popped by (1) reading from R and (2) decrementing RP. Thus RP normally points to the Top of Return Stack (TORS) value making TORS rapidly accessible.

R micro-orders are,

DRwr, stack write, determines the action of stack read or write, and R←→T, 'R to and from T', to select R for reading or writing.

(e) The Return Stack Pointer (RP)

A 12-bit stack pointer is implemented with three 74F191 synchronous 4-bit up/down counters, IC27–IC29, although only ten lines are actually utilised to drive R address lines A0–A9. RP is preset loadable to allow the stack pointer value to be initialised (e.g. by RP!), and also to allow R to be randomly accessed under microcode control.

RP micro-orders are,

DT→RP, 'T to RP', to preset load RP from the value on the T-bus,

RPUSH, to select the counting function of RP as 'up' or 'down', and

RPclock, to clock the counter.

(f) Return Stack Pointer Buffer (RPB)

A tri-state buffer is realised with two 74AS573 devices, IC30 and IC31, in order to provide a means of gating the current RP value onto the T-bus, for instructions such as RP@.

RPB micro-orders are,

RP→T, 'return stack pointer to T', to enable RP onto the T-bus.

(g) The Data Latch (DL)

The Data Latch (DL), realised with two 74AS652 devices, IC41 and IC42, provides the interface between the external 16-bit data bus D0–D15 and the T-bus. Note that the execution sequencer takes its fetched instructions directly from the data bus, thus DL is needed only to transfer literal data or results between the CPU (ASU+RSU) and external memory or i/o.

DL is a multi-mode bi-directional tristate latch but only two modes are used here. (1) When writing data out to memory the T-bus is transparently enabled through to drive the data bus by asserting GAB with the micro-order T→D, and (2) to enable data from the data bus onto the T-bus the external data is latched with CBA and enabled onto T by GBA*, with the micro-order T→D. Inverter IC43-B ensures that the data is latched on the rising edge of T→D and enabled onto the T-bus while T→D is on.

DL micro-orders are,

T→D, 'T to D', to enable the T-bus to drive the data bus, and

D→T, 'D to T', to latch the data bus into DL and present the data to the T-bus.

Note that T→D is used to generate the active-low WRITE* signal for external memory access, via inverter IC43-A.

(c) The Page Pointer (PP)

An 8-bit page address pointer, realised with a single 74AS652 device IC40, is used to generate high order address bits A16–A234. PP is loaded from the T-bus and is permanently enabled to drive address lines A16–A234 (GAB high). Loading is accomplished by the micro-order T→PP driving the CAB (clock A to B) input of IC40. Additionally the means is provided to allow the contents of PP to be enabled onto the T-bus under the control of micro-order PP→T, this is needed in, for example, an interrupt call, where a complete 24-bit address needs to be pushed onto the return stack.

PP micro-orders are,

T→PP, 'T-bus to Page Pointer', to latch T into PP to drive A16–A23, and

PP→T, 'Page Pointer to T-bus', to read the contents of PP onto T-bus.

Execution Sequencer

Figure 8:
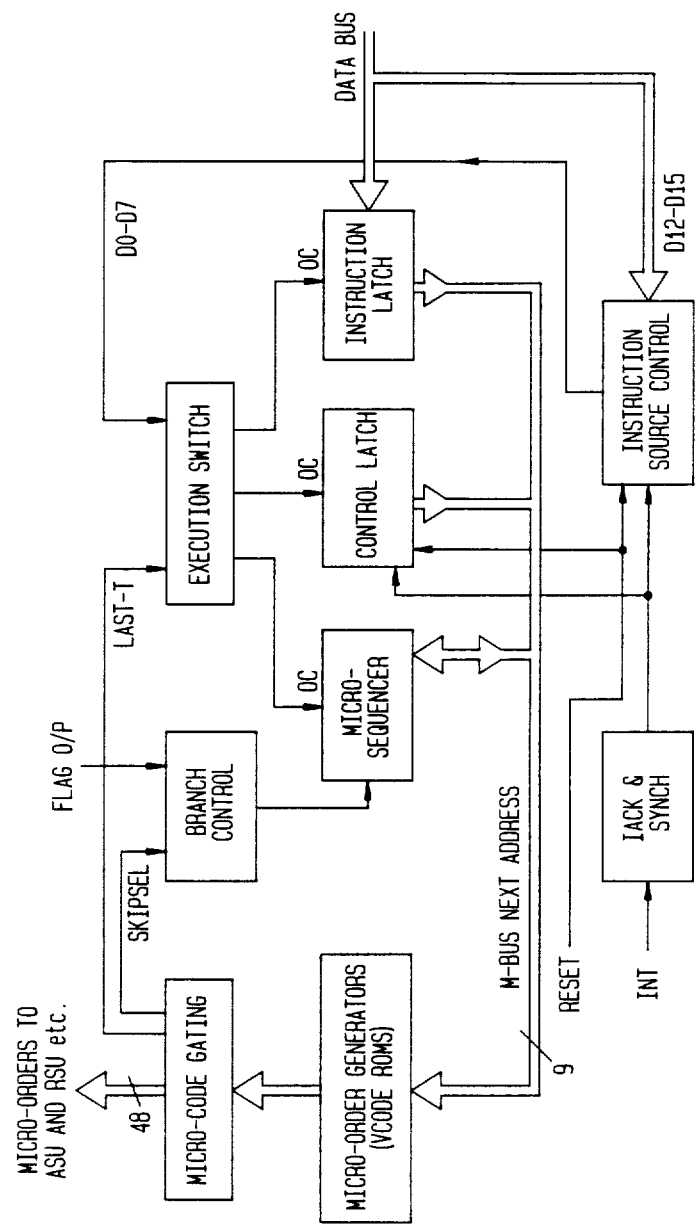
FIG. 8 shows a detailed block diagram of an execution sequencer for use in a central processor unit in accordance with the second aspect of the present invention.

Refer to FIG. 8, the functional elements of the execution sequencer are as follows:

(a) The Instruction Sequencer

The heart of the execution sequencer is IC51 and IC60 (the micro-sequencer) with microcode branching implemented with IC65-A, IC65-B and IC43-E. The principle of operation is as follows.

ROM IC60 provides the next address for the sequencer which is modified by the branch circuitry and then latched in IC51. The branch control circuitry is used to optionally force the next address to the next highest odd location. This takes place when, 1. SKIPSEL is low, indicating that this is a microcode skip cycle, AND
2. FLAG O/P is low, i.e. the ALU flag is set to TRUE.

The clock to IC51 is delayed to allow time for the extra delay imparted by the branch control circuitry.

There are two other sources of the next address; the control latch (IC52) and the instruction latch (IC53).

The control latch contains one of three addresses, 0. the next instruction sequence will be a 'thread',
1. the next instruction sequence will be an 'interrupt', or
3. the next instruction sequence will be a 'reset'.

The instruction latch (IC53) contains the value of the external data bus D0–D7 (regardless of its validity) at the last clock transition. Providing that the sequencer fetched either an instruction or address from memory, then IC64-B,C and D will determine which by testing the top 4 bits, D12–D15, of the incoming data.

The execution switch, composed of IC63-A,B and IC44-B enables either the control latch or the instruction latch onto the M-BUS (next address), depending on the nature of the next instruction or address. The execution switch is enabled by the micro-order LAST-T, which is asserted at the end of each instruction sequence to re-load the execution sequencer with the next instruction. The starting micro-address of the next instruction (1) is determined as follows,

| RESET | INT | OR(D12–D15) | Next Instruction |
|-------|-----|-------------|------------------|
| 1 | X | X | RESET (I=3) |
| 0 | 1 | X | INT (I=1) |
| 0 | 0 | 0 | THREAD (I=0) |
| 0 | 0 | 1 | (I=Instruction latch) |

The effect of the LOCRESET line going low is to,
1. present instruction 3 to the control latch IC52 to be loaded on the next rising edge of LCLK, and
2. force the execution switch into 'internal' mode on the next rising edge of LCLK, to enable the control latch to supply the next micro-address.

The effect of the INT line going low is to,
1. present instruction 1 to the control latch, and
2. force the execution switch into internal mode, to enable the control latch to supply the next micro-address.

The incoming interrupt sets the interrupt acknowledge (IACK) latch IC61-B, which remains set until the interrupt mask (IM) IC9-B is set by the interrupt instruction.

IM=0 (Clear) No response from IACK latch

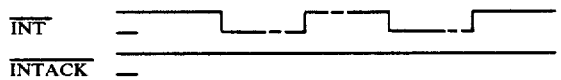

IM=1 (I Mask set)

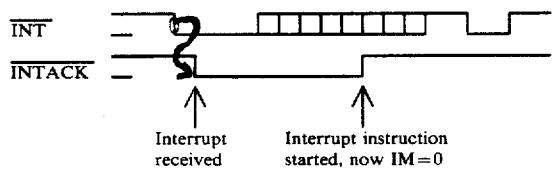

The output of the IACK latch is asynchronous. To ensure that the control latch and the execution switch latch the correct data, the inputs must be stable on the rising edge of LCLK. The output of IACK is thus synchronised to a different edge i.e. ICLK (inverted clock) to ensure both latches receive the same signals. Synchronisation is done in the interrupt synchronisation latch IC61-A.

(b) Clock Generation

The 20 MHz system clock is generated with a 38/12 mark/space ratio. This is accomplished by ANDing the original clock with a delayed & inverted version itself. IC72 and IC62-C generate a combined delay of between 11 & 13 nS, thus the waveforms on NAND IC63-C are as follows,

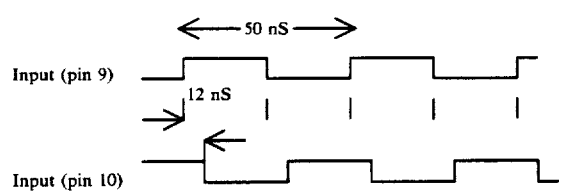

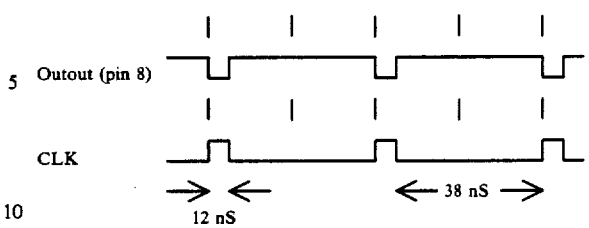

The output m/s ratio is dependent upon the delay line element and is not affected by the original m/s ratio of the crystal oscillator.

The reason for such a clock shape is explained below is section 4.3.

The clock generator provides three separate outputs,
1. CLK. System clock to synchronous components not within the execution sequencer,
2. LCLK. Clock to micro-sequencer. CLK and LCLK are separate to minimise loading and distortion on either output,
3. ICLK. Inverted clock, used for the internal synchronisation circuitry, and
4. DCLK. A clock delayed by the same amount as signals gated by the microcode gating latches.

(c) Microcode clock gating

This is performed by IC70 and 71. There are two reasons for this gating,
1. synchronisation of clocks to asynchronous devices with the clocks of synchronous devices, e.g. latches, D-types etc, and
2. deferring a transparent action for a short period of time to enable other signals to stabilise, e.g. stack ram selects and writes.

The microcode clock gating ensures that the rising edges of ALU→ALUH, IP→IPH and T→IP are within 1 ns of DCLK, and that E→SP, T→RP, SWR, RWR are protected from spurious writes during the first 12 nS of each machine cycle.

The External Address/Data Bus

A simple non-multiplexed synchronous bus allows local memory and input output to be accessed at the full speed of the processor, without the need for wait-states or memory ready signals. The basic timing constraint is provided by the memory request signal MREQ (active low), which is in general 100 nS duration (for a processor clock of 20 MHz). Within this 100 nS period the main memory must perform address decoding ( 20 nS), allow for buffering and bus delays ( 20 nS) between the processor and memory, and still leave time for memory read or write access times. Given the worst case assumptions above gives a memory access time requirement of ≦ =60 nS. Individual memory requests are separated by at least one t-state, so that a complete memory request cycle occurs at most every 150 nS.

Memory requests are controlled by the three signals MREQ', WR' and BYTE'. The WR' signal determines whether the memory request is for a read or write operation, the BYTE' signal determines whether the operation is to be a word (16-bit) transfer or a byte (8-bit) transfer. In the event that BYTE' is low—indicating an 8-bit memory operation—the low order address bit A0 selects the high or low byte of the word addressed by A1-A23. When BYTE' is high—indicating a 16-bit operation—the address bit A0 is ignored. The bus thus allows for both 16-bit and 8-bit memory operations, but it is the responsibility of the memory to perform word or byte selection and routing.

Two additional control signals are INT' and INTACK', the interrupt input and it's acknowledge signal respectively. These are described in more detail below.

The bus is physically implemented on a 96-way indirect edge connector

The bus signals are defined as follows:

PGND
: Power Ground. The main ground return to the +5 V power supply.

+5 V
: +5 V connection to main power supply.

A0-A23
: Address bus, active high, all TTL levels permanently driven by the processor.

AGND
: Ground returns for address bus drivers and receivers.

INT'
: Interrupt, active low, input to processor. Providing that the interrupt mask is enabled (using the IM! instruction), then a falling edge on the INT' line will interrupt the processor, forcing a THREAD to location 10 (hex).

INTACK'
: Interrupt acknowledge, active low, output from processor. A falling edge on this line indicates that the INT' signal has been accepted (i.e. interrupts were enabled), a rising edge will follow shortly after to indicate that the interrupt service routine has started. For timing details see FIG. 1.

BYTE'
: Not byte, active low, output from processor. This signal is valid during memory requests (MREQ' low). A high level indicates that a 16-bit memory operation has been requested, a low level that a byte (8-bit) memory operation has been requested. If BYTE' is low then A0 selects between upper or lower byte, otherwise A0 should be ignored.

MREQ'
: Not memory request, active low, output from processor. A low on this signal indicates that a memory transfer is requested. The direction of the transfer will be indicated by WR', the nature of the transfer (word or byte) by BYTE', and the address of the memory (or input output) requested by A0-A23. None of these signals are valid while MREQ' is high. Detailed timing is shown in FIG. 1.

WR'
: Not write, active low, output from processor. This signal is valid during memory requests (MREQ' low). A high indicates that the operation requested is a 'read' from memory in which case the data read must be placed on the data bus D0-D15. A low indicates 'write' into memory in which case the data to be written will be present on the data bus D0-D15 during the MREQ active period.

SGND
: Ground returns for control signal (INT' INTACK' BYTE' MREQ' and WR') drivers and receivers.

D0-D15
: Data bus, active high, bi-directional. D0-D15 are driven outputs only during SMREQ' low and WR' low. At all other times D0-D15 are tristate.

DGND
: Ground returns for data bus drivers and receivers.

We claim:

1. A data processing system for executing arithmetical and logical operations on electronic data comprising a stack in which data is stored in respective storage elements in sequence and retrieved from the storage elements on a first in, last out bias from one end of the sequence referred to as the top of the stack, a stack pointer for addressing the storage element which is at the top of the stack, and an arithmetic logic unit for performing arithmetical and logical operations on data presented at inputs thereto and generating a result that is produced at an output; wherein said inputs of said arithmetic logic unit are connected to the storage element at the top of the stack and to the next storage element in the sequence of the stack so that data on which an operation is to be performed is automatically present at inputs of said arithmetic logic unit, and the output of the arithmetic logic unit is connected to the storage element at the top of stack so that the result of an operation is automatically returned thereto.

2. A data processing system according to claim 1, wherein the stack is a data structure implemented in random access memory.

3. A central processor unit, comprising:

a data processing unit for executing arithmetical and logical operations on electronic data, which includes a first stack in which data is stored in respective storage elements in sequence and retrieved from the storage elements on a first in, last out bias from one end of the sequence referred to as the top of the stack, a stack pointer for addressing the storage element which is at the top of the stack, and an arithmetic logic unit for performing arithmetical and logical operations on data presented at inputs thereto and generating a result that is produced at an output, said inputs of said arithmetic logic unit being connected to the storage element at the top of the stack and to the next storage element in the sequence of the stack so that data on which an operation is to be performed is automatically present at inputs of said arithmetic logic unit, and the output of the arithmetic logic unit being connected to the storage element at the top of stack so that the result of an operation is automatically returned thereto;

a second first in, last out stack for storing subroutine return addresses of high level language procedures; and an execution sequencer functionally connected to both stacks to provide control signals thereto and to coordinate operation thereof.

* * * * *